United States Patent [19]

Hutchens

[11] Patent Number: 5,031,539

[45] Date of Patent: Jul. 16, 1991

[54] RADIATION CURABLE ROCKET MOTOR LINER FOR CASE BONDED SOLID PROPELLANT

[75] Inventor: Dale E. Hutchens, Huntsville, Ala.

[73] Assignee: Thiokol Corporation, Ogden, Utah

[21] Appl. No.: 467,728

[22] Filed: Jan. 19, 1990

[51] Int. Cl.$^5$ .......................... C06B 45/10; F02K 9/04
[52] U.S. Cl. ..................................... 102/290; 264/3.1; 149/19.4
[58] Field of Search .......................... 264/3.1; 102/290; 149/19.4

[56] References Cited

U.S. PATENT DOCUMENTS

| | | | |
|---|---|---|---|
| 4,232,608 | 11/1980 | Wrightson | 102/290 |
| 4,429,634 | 2/1984 | Byrd et al. | 102/290 |
| 4,601,862 | 7/1986 | Byrd et al. | 264/3.1 |
| 4,638,735 | 1/1987 | Lela et al. | 102/290 |
| 4,803,019 | 2/1989 | Graham et al. | 264/3.1 |

*Primary Examiner*—Edward A. Miller
*Attorney, Agent, or Firm*—Parmelee, Bollinger & Bramblett

[57] ABSTRACT

Improved bonding of hydroxyl-terminated polybutadiene based propellant grains to rocket motor liners and liners which are ultraviolet light radiation curable are provided by employing an acrylated polymer and an [[[(isocyanatoorgano)amino]carbonyl]oxy] alkyl propenoate in the liner composition.

15 Claims, No Drawings

RADIATION CURABLE ROCKET MOTOR LINER FOR CASE BONDED SOLID PROPELLANT

FIELD OF THE INVENTION

This invention relates to radiation curable liners for rocket motor cases and to an improved composition for use as a liner layer in a rocket motors. The invention also relates to improved adhesion of ultra-violet (UV) cured gumstock to propellant and to rocket motor liners which can be fully cured by sunlight or a source of ultraviolet light, such as an ultraviolet lamp, and in some instances in as short a time as about five minutes.

BACKGROUND OF THE INVENTION

Rocket motors employing solid propellant generally have a rigid outer casing or shell (case), a liner layer bonded to the insulating layer and a solid propellant grain bonded to the liner. In general, case bonded solid propellant grains possess greater strength because of the additional support given by their adherence to the rocket motor casing in which they are contained. To insure the maximum strength and to prevent separation of the propellant grain from the motor walls which would create voids and therefore a potential for uneven burning, it is desirable that the propellant grain be bonded to the motor casing uniformly and firmly.

This is usually accomplished by very careful cleaning and descaling of the inside surface of the metal motor case, applying and vulcanizing an elastomeric insulator, followed by coating the inside surface with a liner, normally the binder used for the propellant grain, then casting the liquid propellant in place and curing into the final grain form. The liner serves as a bonding agent between the case and the propellant grain, as an inhibitor preventing burning down the outer surface of the grain and as an insulator, protecting the case from the heat and gases of combustion when burning has progressed to the point at which the case would otherwise be exposed.

U.S. Pat No. 4,429,634 of J. Byrd and J. Hightower, issued Feb. 7, 1984 to Thiokol Corporation, discloses a typical means of providing such a liner for bonding a solid propellant grain to a rocket motor casing employing an aziridine in a polyisocyanate cured hydroxyl-terminated polybutadiene based liner. Similarly, in U.S. Pat. No. 4,601,862 of J. Byrd and R. Davis, issued July 22, 1986 to Morton Thiokol, Inc., there is disclosed a process for providing a delayed quick cure rocket motor liner for binding a solid propellant grain to a rocket motor casing by utilizing a hydroxyl-terminated polybutadiene prepolymer, a polyisocyanate curing agent for curing said prepolymer by forming urethane linkages, a trifunctional aziridine adhesion promoter, filler and a curing catalyst comprising maleic anhydride, magnesium oxide and triphenyl bismuth.

However, it would be preferable if one were not restricted in the manufacturing process by the "potlife" of liner formulation, and if one could rapidly cure the liner mixture in the case. The state of the art prior art materials described above have a working potlife of typically about 1 to 12 hours once the isocyanate and hydroxy terminated prepolymer are mixed, and required from about 4 to 48 hours curing time in heated (63° C. to 77° C.) ovens. Potlife is defined as the amount of time a liner formulation is liquid enough to be spray or sling applied. It is also desirable that a ready and easy means be available for curing the liner composition, such as by radiation, e.g. UV radiation from sunlight, and that additional curing agents for curing the liner or the hydroxyl-terminated polybutadiene prepolymer not be required. A further objective of the invention would be to provide a rocket motor case liner that itself bonds to the solid propellant thereby improving liner/propellant adhesion.

SUMMARY OF THE INVENTION

The objects of this invention are obtained by employing a formulation containing an [[[(isocyanatoorgano)amino]carbonyl]oxy] alkyl propenoate monomer and an acrylated polymer in the composition which is essentially free of "potlife" restrictions and may be cured in as little as five minutes. The [[[(isocyanatoorgano)amino]carbonyl]oxy] alkyl propenoate provides for 1) a reduction in the viscosity of the acrylated polymer, 2) an acrylate site for photocuring of the polymer and 3) an isocyanate site for thermal reaction with the propellant binder to improve and aid in liner/propellant adhesive. Due to the thermal stability of the photoinitiator, the acrylated materials are unreactive until exposed to UV radiation; due to the lack of moieties which react with isocyanates (e.g. amino or hydroxyl) the isocyanate is stable in the mixture. Thus, in the absence of UV radiation, the composition remains fluid and has an essentially infinite "potlife". The invention also comprises forming a liner in a rocket motor case employing such a formulation or composition and to the resulting lined rocket motor case containing solid propellant grain.

DETAILS OF THE INVENTION

The objects of the present invention are obtained by producing a rocket motor liner for a solid propellant rocket motor case by employing a composition comprising a curable acrylated polymer and a [[[(isocyanatoorgano)amino]carbonyl]oxy] alkyl propenoate of the formula:

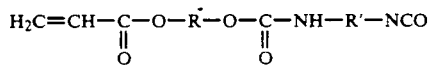

wherein R is an alkylene radical of from about 1 to about 6 carbon atoms, preferably 1 to 4 and most preferably 2 carbon atoms, and R' is the divalent organic residue of a diisocyanate. R' can be any suitable organic moiety, such as for example, substituted or unsubstituted alkylene, cycloalkylene or arylene, and the like. Most preferably R' is a divalent tolylene moiety derived from toluene diisocyanate and R is ethylene. The [[[(isocyanatoorgano)amino]carbonyl]oxy] alkyl propenoate compounds are either known or readily reprepared by reaction of an hydroxy alkyl acrylate of the formula:

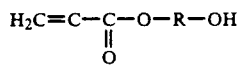

with a diisocyanate of the formula:

wherein R and R' are as defined hereinbefore. The preferred [[[(isocyanatoorgano)amino]carbonyl]oxy]

alkyl propenoate is 2-[[[(3-isocyanatomethylphenyl)amino]carbonyl]oxy] ethyl propenoate (CAS #54554-39-1) prepared from 2,4-toluene diisocyanate and hydroxy ethyl acrylate.

As examples of R radicals there may be mentioned methylene, ethylene, propylene, butylene, pentylene and hexylene. Any suitable diisocyanate may be employed to provide the R' moiety of the compounds of this invention. As examples of diisocyanates suitable for use in this invention, there may be mentioned, for example, isophorone diisocyanate, hexamethylene diisocyanate, 1-methoxyphenyl-2,4-diisocyanate, ethylphenyl-2,4-diisocyanate, 1,3,5-triethylphenyl-2,4-diisocyanate, 1-methyl-3,5-diethyl-6-chlorophenyl-2,4-diisocyanate, 6-methyl-2,4-diethyl-5-nitrophenyl-1,3-diisocyanate, 1-3-dimethyl-4,6-bis($\beta$-isocyanatoethyl)benzene, 3-($\alpha$-isocyanatoethyl)phenylisocyanate, 4-chlorophenyl-1,3-diisocyanate, 1-methyl-4-methoxyphenyl-2,5-diisocyanate, 1-ethoxyphenyl-2,4-diisocyanate, 1,3-dimethoxyphenyl-4,6-diisocyanate, 1,4-dimethoxyphenyl-2,5-diisocyanate, 1-propoxyphenyl-2,4-diisocyanate, 1-isobutoxy-2,4-diisocyanate, 1,4-diethoxyphenyl-2,5-diisocyanate, toluene-2,4-diisocyanate, toluene-2,6-diisocyanate, toluene-2,5-diisocyanate, toluene-3,5-diisocyanate, diphenylether-4,4'-diisocyanate, naphthalene-1,4-diisocyanate, 1,1'-dinaphthalene-2,2'-diisocyanate, biphenyl-2,4-diisocyanate, 4,4'-biphenylene diisocyanate, 3,3'-dimethylbiphenyl-4,4'-diisocyanate, 3,3'-dimethoxybiphenyl-4,4'-diisocyanate, 3,3'-diethoxybiphenylene-4,4'-diisocyanate, diphenylmethane-4,4'-diisocyanate, diphenylmethane-2,4'-diisocyanate, diphenylmethane-2,2'-diisocyanate, 3,3'-dimethoxy diphenylmethane-4,4'-diisocyanate, 3,3'-dimethyl diphenylmethane-4,4'-diisocyanate, benzophenone-3,3'-diisocyanate, ethylene diisocyanate, propylene diisocyanate, butylene diisocyanate, pentylene diisocyanate, methylbutylene diisocyanate, tetramethylene diisocyanate, pentamethylene diisocyanate, dipropyl diisocyanate ether, heptamethylene diisocyanate, 2,2-dimethylpentylene diisocyanate, 3-methoxy-hexamethylene diisocyanate, octamethylene diisocyanate, 2,2,4-trimethylpentylene diisocyanate, 3-butoxyhexamethylene diisocyanate, 1,3-dimethylbenzene diisocyanate, 1,4-dimethyl benzene diisocyanate, 1,2-dimethylcyclohexane diisocyanate, 1,4-dimethylcyclohexane diisocyanate, 1,4-dimethylbenzene diisocyanate, 1,4-dimethylnaphthalene diisocyanate, 1,5-dimethylnaphthalene diisocyanate, cyclohexane-1,2-diisocyanate, cyclohexane-1,3-diisocyanate, cyclohexane-1,4-diisocyanate, 1-methylcyclohexane-2,4-diisocyanate, 1-methylcyclohexane-2,6-diisocyanate, 1-ethylcyclohexane-2,4-diisocyanate, dicyclohexylmethane-4,4'-diisocyanate, dicyclohexylmethylmethane-4,4'-diisocyanate, dicyclohexyldimethylmethane-4,4'-diisocyanate, 2,2-dimethyldicyclohexylmethane-4,4'-diisocyanate, 3,3',5,5'-tetramethyldicyclohexylmethane-4,4'-diisocyanate, 4,4'-methylenebis (cyclohexylisocyanate), ethylidene diisocyanate, 4,4'-diphenyl diisocyanate, dianisidine diisocyanate, 1,5-naphthalene diisocyanate, m-phenylene diisocyanate, p-phenylene diisocyanate, isopropylidene bis(phenyl or cyclohexyl isocyanate, 1,3-cyclopentylene diisocyanate, 1,2-cyclohexylene diisocyanate, 1,4-cyclohexylene diisocyanate, phenylethylene diisocyanate, and the like.

Suitable photocurable polymers for the liner compositions of this invention carry acrylate or methacrylate functional moieties; these groups are free-radically crosslinked with each other or other diluent monomers by the action of UV radiation on a suitable photoinitiator, such as hydroxy iso-butyrophenone. Examples of such polymers include polar polymers such as UVITHANE 782, a polyester acrylate from Morton International and a number of non-polar polymers such as ZL-1365, a saturated hydrocarbon acrylate from Morton International; ECHO 306, an acrylated acrylonitrile butadine copolymer from Echo Resins and Laboratory; RDX 51043, an acrylated rubber-modified epoxy by Interez; or SR 5000, an acrylated polybutadiene by Sartomer Corporation and similar methacrylate-functional analogous polymers. Diluent monomers include ethoxyethoxyethyl acrylate, tetrahydrofurfuryl acrylate, iso-octyl acrylate or lauryl acrylate or similar methacrylate analogs.

The UV curable liner compositions of this invention will generally comprise from 20% to about 99% by weight photocurable acrylated polymer; from 0% to about 80% monofunctional acrylated monomer diluents; and from about 1% to about 40% by weight of [[[(isocyanatoorgano)amino]carbonyl]oxy] alkyl propenoate based on the total weight of acrylated components. These photocurable acrylated components will constitute 90–99% by weight of the total liner composition; the remaining 1–10% being a suitable free radical photoinitiator, such as, for example, hydroxy iso-butyrophenone.

The propellant formulation may be a hydroxyl-terminated polybutadiene based propellant grain. Typically such an hydroxyl-terminated polybutadiene may comprise a propellant consisting of a hydroxyl-terminated polybutadiene as a binder in an amount of from about 8 to about 25% by weight and including such conventional compounding ingredients as dioctyl adipate as plasticizer, an oxidizer such as, ammonium perchlorate up to 75 to 90% by weight, if desired, a portion of metallic fuel such as aluminum metal, and other conventional combustion stabilizers, flame coolants and the like.

It will be recognized that any liquid hydroxyl-terminated polymer, preferably a hydroxyl-terminated polybutadiene polymer, known to be useful for propellant grain binding may be used in this invention. As examples of such preferred hyroxyl-terminated polybutadienes suitable for use in this invention there may be mentioned those sold under the trade designations R-45M or R-15M, R-45HT and CS-15 available from ATOCHEM Company and Butarez HTS available from Phillips Petroleum Company.

Also, the propellant formulation may also be of such a type as would employ 6 to 30% by weight of an isocyanate curative and hydroxyl-terminated polyether (such as PEG 4000 of DOW Chemical Co., a polyethylene oxide), a hydroxyl-terminated polyester (such as TONE 0260 of Union Carbide Corp., a polycapralactone) or nitrocellulose. Such propellants would typically contain 20% to 70% by weight of nitrato esters such as butanetriol trinitrate or trimethylolethane trinitrate. Nitramines such as cyclo - 1, 3, 5 trimethylene - 2, 4, 6 trinitramine (RDX) or cyclotetramethylene tetranitramine (HMX) may be included in an amount of from about 0% to 70% by weight.

According to this invention a rocket motor liner composition of this invention may be formulated and cast as a liner in a rocket motor case and UV radiation cured, such as by sunlight or preferably by a medium pressure mercury vapor lamp. Thereafter, hydroxyl-terminated based propellant grain binder, in an uncured form, may be cast into the desired configuration in the lined rocket motor and cured thermally due to the presence of the isoorganato groups in the [[[(isocyanatoorgano)amino]carbonyl]oxy] alkyl propenoate which are not reactive with the acrylated polymer in the liner but which are reactive with the hydroxy groups of the binder in the propellant grain. The resulting case lined rocket motors have both improved adhesion of the liner to the rocket motor casing and improved bonding of the liner to the solid propellant grain. Additionally, with the liner composition of this invention a profile of the propellant hardness evidences neither hard nor soft layers at the bondline, such layers being generally undesirable in solid propellant rocket motors.

The liner compositions of this invention and the advantages thereof are further illustrated but not limited by the following examples.

EXAMPLE 1

A typical liner composition of this invention is prepared by preparing a 50:50 mixed blend of UVITHANE 782 polyester urethane diacrylate polymer and 2-[[[(3-isocyanatomethylphenyl)amino]carbonyl]oxy] ethyl propenoate prepared by the reaotion of hydroxyethyl acrylate and 2,4-toluene diisocyanate. Said liner composition comprises 49% by weight UVITHANE 782, 49% by weight 2-[[[(3-isocyanatomethylphenyl)amino]carbonyl]oxy] ethyl propenoate and 2% by weight of hydroxy iso-butyrophenone photoinitiator. For comparison purposes, a similar liner composition of only UVITHANE 782 was also prepared. The liner composition of this invention was cured with UV sunlight for at least about one hour. Propellant formulations containing aluminized hydroxyl-terminated polybutadiene polymer as described previously were then cast and cured on the surface of each liner composition. For the comparative composition containing only UVITHANE 782, 90° peel adhesion of the neat polymer to the aluminized propellant was in the range of from about 0-2 pounds per linear inch (pli) and for the liner composition of this invention the 90° peel adhesion of the liner composition to the identical aluminized hydroxyl-terminated polybutadiene propellant was 4.0 pli.

In the peeling tests above, the specimens separated between the liner and propellant as the 90° load was applied. This is adhesive propellant-to-liner failure. In some instances, the liner-to-propellant adhesive strength is so great that failure occurs at another bond interface or the cured propellant will tear as the 90° load is applied; this tearing is cohesive failure. A propellant-to-liner bondline is considered acceptable if a 90° peel test is characterized by either 1) failure away from the propellant-to-liner interface or 2) adhesive failure of high magnitude.

EXAMPLE 2

In a test similar to that described in Example 1, a rocket motor liner formulation of this invention comprising 78.5% by weight ZL-1365 saturated hydrocarbon diacrylate polymer, 17.5% by weight 2-[[[(3-isocyanatomethylphenyl)amino]carbonyl]oxy] ethyl propenoate and 4% by weight of hydroxy iso-butyrophenone photoinitiator was prepared and was comparative tested with a similar formulation comprising only the ZL-1365 saturated hydrocarbon diacrylate polymer. The liner composition of this invention was allowed to cure with UV sunlight for at least about one hour. An aluminized propellant formulation containing hydroxyl-terminated polybutadiene polymer as described previously was then cast and cured on the surface of each liner composition. For the comparative composition containing only ZL-1365, 90° peel adhesion of the neat polymer to the aluminized propellant was 4.6 pli whereas the 90° peel adhesion of the liner formulation of this invention to an identical aluminized hydroxyl-terminated polybutadiene propellant was 6.47 pli. The liner formulation of this invention demonstrates a much higher level of adhesion to propellant before break down of the adhesion occurs compared to the level of adhesion reached by a liner formulation of only ZL-1365 polymer and the identical propellant.

EXAMPLE 3

A lined rocket motor casing according to this invention is prepared in the following manner. A liner composition is prepared by mixing and blending 49% by weight UVITHANE 782 polyester urethane diacrylate polymer, 49% by weight 2-[[[(3-isocyanatomethylphenyl)amino]carbonyl]oxy] ethyl propenoate and 2% by weight hydroxy iso-butyrophenone. The blended mixture was cast in a rocket motor case by conventional procedures, such as by sling coating, and cured with a 125 watt mercury vapor lamp in about 5 minutes. The normal thickness obtained in one application of a liner composition to the casing is from about 0.0005 to 0.020 inch (0.127 to 0.508 mm). The lined case is then preheated in an oven or casting pit to receive the uncured propellant, for example, an aluminized hydroxyl-terminated polybutadiene propellant as described hereinbefore. The propellant is cast adjacent to the liner and permitted to cure at about 170° F. whereby the isocyanate group of the 2-[[[(3-isocyanatomethylphenyl)amino]carbonyl]oxy] ethyl propenoate monomer in the liner composition is permitted to react with free hydroxyl group of the hydroxyl-terminated polybutadiene polymer in the propellant grain.

The foregoing examples illustrate the radiation curable liners for rocket motor cases and an improved composition for use as a liner layer in a rocket motors. It will be apparent to those skilled in the art that the foregoing description is merely illustrative of the invention and that the invention has numerous embodiments not specifically exemplified.

I claim:

1. In the process of applying a rocket motor liner to an inside surface of a rocket motor case by coating said case with a rocket motor liner composition and then curing said liner composition; wherein the improvement comprises using a rocket motor liner composition comprising a UV curable mixture of an acrylated polymer and a [[[(isocyanatoorgano)amino]carbonyl]oxy] alkyl propenoate monomer of the formula:

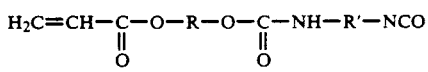

wherein R is a divalent alkyl radical of from 1 to about 6 carbon atoms and R' is the divalent organic residue of an organic diisocyanate 2. The process of claim 1 wherein the acrylated polymer is a polyester urethane diacrylate polymer and the monomer is 2-[[[(3-isocyanatomethylphenyl)amino]carbonyl]oxy] ethyl propenoate.

3. The process of claim 2 wherein the liner composition comprises about 40% by weight of a polyester urethane diacrylate polymer, about 49% by weight of 2-[[[(3-isocyanatomethylphenyl)amino]carbonyl]oxy] ethyl propenoate and about 2% by weight of hydroxy iso-butyrophenone.

4. The process according to claim 1 wherein the acrylated polymer is a saturated hydrocarbon diacrylate polymer and the monomer is 2-[[[(3-isocyanatomethylphenyl)amino]carbonyl]oxy] ethyl propenoate.

5. The process according to claim 4 wherein the liner composition comprises from about 78.5% by weight saturated hydrocarbon diacrylate polymer, about 17.5% by weight 2-[[[(3-isocyanatomethylphenyl)amino]carbonyl]oxy] ethyl propenoate and about 4% by weight of hydroxy iso-butyrophenone.

6. A process for case bonding a hydroxyl-terminated polybutadiene polymer based solid propellant grain to a rocket motor case which comprises:
   a) lining a rocket motor case to which it is desired to case bond said solid propellant grain with a UV curable liner composition comprising an acrylated polymer and an [[[(isocyanatoorgano)amino]carbonyl]oxy] alkyl propenoate monomer of the formula:

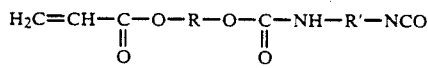

wherein R is a divalent alkyl radical of from 1 to about 6 carbon atoms and R' is the divalent organic residue of an organic diisocyanate,
   b) curing said rocket motor case liner with UV light,
   c) casting said hydroxyl-terminated polybutadiene based propellant into a desired configuration in said lined rocket motor case, and
   d) thermally treating said rocket motor cased propellant grain to permit reaction of isocyanate groups of the monomer in the liner composition with hydroxy groups of the hydroxyl-terminated polybutadiene polymer in the propellant grain.

7. The process of claim 6 wherein the acrylated polymer is a polyester urethane diacrylate polymer and the monomer is 2-[[[(3-isocyanatomethylphenyl)amino]carbonyl]oxy] ethyl propenoate.

8. The process of claim 7 wherein the liner composition comprises about 49% by weight of a polyester urethane diacrylate polymer, about 49% by weight of 2-[[[(3-isocyanatomethylphenyl)amino]carbonyl]oxy] ethyl propenoate and about 2% by weight of hydroxy iso-butyrophenone.

9. The process according to claim 6 wherein the acrylated polymer is a saturated hydrocarbon diacrylate polymer and the monomer is 2-[[[(3-isocyanatomethylphenyl)amino]carbonyl]oxy] ethyl propenoate.

10. The process according to claim 9 wherein the liner composition comprises from about 78.5% by weight saturated hydrocarbon diacrylate polymer, about 17.5% by weight 2-[[[(3-isocyanatomethylphenyl)amino]carbonyl]oxy] ethyl propenoate and about 4% by weight of hydroxy iso-butyrophenone.

11. A case bonded solid propellant rocket motor wherein said motor contains a UV cured bonded casing liner formed from a UV curable liner composition comprising a mixture of an acrylated polymer and a [[[(isocyanatoorgano)amino]carbonyl]oxy] alkyl propenoate monomer of the formula:

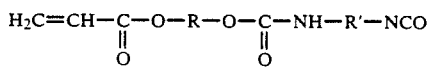

wherein R is a divalent alkyl radical of from 1 to about 6 carbon atoms and R' is the divalent organic residue of an organic diisocyanate.

12. A case bonded solid propellant rocket motor of claim 11 wherein the acrylated polymer is a polyester urethane diacrylate polymer and the monomer is 2-[[[(3-isocyanatomethylphenyl)amino]carbonyl]oxy] ethyl propenoate.

13. A case bonded solid propellant rocket motor of claim 12 wherein the liner composition comprises about 49% by weight of a polyester urethane diacrylate polymer, about 49% by weight of 2-[[[(3-isocyanatomethylphenyl)amino]carbonyl]oxy] ethyl propenoate and about 2% by weight of hydroxy iso-butyrophenone.

14. A case bonded solid propellant rocket motor of claim 11 wherein the acrylated polymer is a saturated hydrocarbon diacrylate polymer and the monomer is [[[(3-isocyanatomethylphenyl)amino]carbonyl]oxy] ethyl 15. A case bonded solid propellant rocket motor of claim 14 wherein the liner composition comprises from about 78.5% by weight saturated hydrocarbon diacrylate polymer, about 17.5% by weight 2-[[[(3-isocyanatomethylphenyl)amino]carbonyl]oxy] ethyl propenoate and about 4% by weight of hydroxy iso-butyrophenone.

* * * * *